(12) United States Patent
Austin et al.

(10) Patent No.: US 9,171,183 B2
(45) Date of Patent: Oct. 27, 2015

(54) METHOD AND COMPUTER DEVICE FOR HANDLING COM OBJECTS HAVING ELEVATED PRIVILEGES

(71) Applicant: Avecto Limited, Cheadle Cheshire (GB)

(72) Inventors: Mark James Austin, Manchester (GB); John Goodridge, Cheshire (GB)

(73) Assignee: Avecto Limited, Cheadle Cheshire (GB)

( * ) Notice: Subject to any disclaimer, the term of this patent is extended or adjusted under 35 U.S.C. 154(b) by 203 days.

(21) Appl. No.: 13/847,406

(22) Filed: Mar. 19, 2013

(65) Prior Publication Data
US 2013/0276098 A1 Oct. 17, 2013

(30) Foreign Application Priority Data

Apr. 16, 2012 (GB) .................................. 1206639.5

(51) Int. Cl.
G06F 21/00 (2013.01)
G06F 21/62 (2013.01)
G06F 21/52 (2013.01)
G06F 21/60 (2013.01)
G06F 21/54 (2013.01)
G06F 9/44 (2006.01)

(52) U.S. Cl.
CPC ............ *G06F 21/6281* (2013.01); *G06F 21/00* (2013.01); *G06F 21/52* (2013.01); *G06F 21/604* (2013.01); *G06F 9/443* (2013.01); *G06F 9/4428* (2013.01)

(58) Field of Classification Search
CPC ...... G06F 21/00; G06F 21/52; G06F 21/6281; G06F 9/4428; G06F 9/443; G06F 21/604
USPC ............................................................ 726/17
See application file for complete search history.

(56) References Cited

U.S. PATENT DOCUMENTS

| 4,525,780 | A | 6/1985 | Bratt et al. |
| 5,469,556 | A | 11/1995 | Clifton |
| 6,587,888 | B1 | 7/2003 | Chieu et al. |
| 2003/0225822 | A1 | 12/2003 | Olson et al. |
| 2005/0172138 | A1 | 8/2005 | Ezzat |
| 2006/0259763 | A1 | 11/2006 | Cooperstein et al. |
| 2007/0016773 | A1 | 1/2007 | Perlman et al. |
| 2007/0198933 | A1* | 8/2007 | van der Bogert et al. ..... 715/741 |
| 2007/0226773 | A1 | 9/2007 | Pouliot |
| 2008/0046961 | A1 | 2/2008 | Pouliot |

OTHER PUBLICATIONS

Rey Bango, IE10 Platform Preview 2 is Out with More HTML5 and CSS3 Goodness, Script Junkie, MSDN (Jun. 29, 2011).*
Matthew Conover, "Analysis of the Windows Vista Security Model," http://www.symantec.com/avcenter/reference/Windows_Vista_Security_Model_Analysis.pdf (Symantech Mar. 2006).*

(Continued)

Primary Examiner — Theodore C Parsons
(74) Attorney, Agent, or Firm — Coats & Bennett, PLLC

(57) ABSTRACT

A computer device and method are provided to handle COM objects. A COM creating unit intercepts a request for creation of an elevated COM object by a first user process, determines whether the first user process is entitled to access the COM object, and creates the COM object without elevated privileges. A COM implementing unit intercepts a second user process that implements the COM object, confirms that the second user process is entitled to access the COM object and elevates the privilege level of the second user process to implement the elevated COM object.

15 Claims, 3 Drawing Sheets

(56) References Cited

OTHER PUBLICATIONS

Dean Hachamovitch, "Windows Consumer Preview: The Fifth IE10 Platform", IEBlog, MSDN (Microsoft Feb. 29, 2012).*
Eric Lawrence, "Understanding Enhanced Protected Mode", IEInternals, MSDN (Microsoft Mar. 23, 2012).*
Mark Russinovich, "Inside Windows 7 User Account Control", TechNet Magazine (Microsoft Jul. 2009).*
Mark Yason, "Diving Into IE10s Enhanced Protected Mode Sandbox" (IBM 2014).*
Andy Zeigler, Enhanced Protected Mode, IEBlog, MSDN (Microsoft Mar. 14, 2012).*
Corio, C., "Teach Your Apps to Play Nicely With Windows Vista User Account Control", MSDN Magazine, Jan. 2007, http://msdn.microsoft.com/en-us/magazine/cc163486.aspx, pp. 1-8.

* cited by examiner

METHOD AND COMPUTER DEVICE FOR HANDLING COM OBJECTS HAVING ELEVATED PRIVILEGES

RELATED CASES

This application claims priority to application GB1206639.5 filed 16 Apr. 2012 in the United Kingdom, the entire content of which is incorporated herein by reference.

BACKGROUND

1. Technical Field

The present inventive concept relates generally to the field of computers and computer devices. More particularly, the present inventive concept relates to a method and apparatus for controlling access to component object model (COM) objects by providing an improved COM object handling mechanism.

2. Description of Related Art

The component object model (COM) allows different software components to interact with each other. COM is a widely used technology and allows, for example, a spreadsheet created by Microsoft™ EXCEL™ to be embedded within a document in Microsoft™ WORD™. As a platform-independent, distributed, object-oriented system, COM is a useful tool for creating binary software components that can interact. In particular, COM is a foundation for Microsoft's OLE technology with respect to compound documents (like the WORD and EXCEL example above) and for ActiveX technology for Internet-enabled components.

In Microsoft™ Windows™, like many operating systems, the security model applies the access privileges based on the user's account. The operating system may define privilege levels appropriate to different classes, or groups, of users, and then apply the privileges of the relevant class or group to the particular logged-in user (e.g., ordinary user, super-user, local administrator, system administrator and so on). The user is authenticated by logging in to the computer device, and the user, via their previously prepared security account, acts as a security principal in the security model. The operating system then grants appropriate privileges to processes which execute in that user's security context.

It is desirable to implement a least-privilege access model, whereby each user is granted the minimal set of access privileges which is just sufficient for the user's desired processes to operate on the computer device. However, in practice, many application programs require a relatively high privilege level, such as the local administrator level, in order to install and operate correctly. Hence, there is a widespread tendency to grant additional privilege rights, such as the local administrator level, and thus user processes gain greater access to the resources of the computer device than is desirable or appropriate from a security viewpoint. For example, these additional privilege rights may then enable accidental tampering with key resources of the computer device, leading to errors or corruption within the device. Further, a particular user process (e.g. an infection or malware) may maliciously access key resources of the computer device with the deliberate intention of subverting security or causing damage.

Therefore, there is a need to provide a mechanism which allows the least-privilege principle to be implemented while still enabling the desired, legitimate, processes to execute on the computer device by accessing COM objects created under the component object model. In particular, there is a need to enable effective, higher-level access rights, such as would be equivalent to local administrator rights, but without compromising security of the computer device.

The example embodiments have been provided with a view to addressing at least some of the difficulties that are encountered in current computer devices, whether those difficulties have been specifically mentioned above or will otherwise be appreciated from the discussion herein.

SUMMARY OF THE INVENTION

According to the present invention there is provided a computer device, a method and a computer-readable storage medium as set forth in the appended claims. Other, optional, features of the invention will be apparent from the dependent claims, and the description which follows.

At least some of the following example embodiments provide an improved mechanism for controlling access to COM objects in a computer device. There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one example there is provided a method of controlling access to a COM object in a computer device. The method includes a) intercepting a request for creation of an elevated COM object by a first user process; b) determining whether the first user process is entitled to access the COM object; c) creating the COM object without elevated privileges; d) intercepting a second user process that implements the COM object; e) confirming that the second user process is entitled to access the COM object; and f) elevating a privilege level of the second user process that implements the COM object.

In one example, the step (a) comprises intercepting a call to an operating system of the computer device which requests creation of the COM object.

In one example, the step (b) comprises comparing the request against a set of COM policies which define access to COM objects by the user processes.

In one example, the COM policies define types of COM objects which the user processes are permitted to access and types of COM objects which the user processes are not permitted to access.

In one example, the method further includes passing the request to an operating system of the computer device where the request concerns a type of COM object for which a COM policy is not defined.

In one example, the step (c) comprises creating the COM object without elevated privileges, and the step (f) comprises elevating the privilege level of the second user process to the elevated privilege level of the requested COM object.

In one example, the step (c) comprises recording an identity of the created COM object, the step (d) comprises intercepting the second user process at start-up and extracting an identity of the COM object from the second user process, and the step (e) comprises matching the identity extracted from the second user process with the recorded identity of the COM object.

In one example, the second user process is an in-process dynamic linked library hosted by a surrogate process and the step (d) comprises intercepting the surrogate process.

In one example, the second user process is an out of process executable file and the step (d) comprises intercepting the executable file.

In one example, the step (f) comprises providing the second user process with a revised access token defining the elevated privilege level.

In one example the method includes repeating the steps (a) to (c) upon creation of each of a plurality of COM objects and performing the steps (d) to (f) upon implementation of any of the COM objects.

In one example there is provided a computer device which controls access to COM objects. A COM creating unit intercepts a request for creation of an elevated COM object by a first user process, determines whether the first user process is entitled to access the COM object, and creates the COM object without elevated privileges. A COM implementing unit intercepts a second user process that implements the COM object, confirms that the second user process is entitled to access the COM object and elevates the privilege level of the second user process to implement the elevated COM object.

In one example, the COM creating unit comprises a client COM handling unit embedded within the first user process which is arranged to intercept calls to an operating system of the computer device, and a COM handling service unit in an elevated privilege context which is arranged to communicate with the client COM handling unit.

In one example, the COM implementing unit comprises an intercepting unit which intercepts the second user process.

In one example, a tangible non-transient computer-readable storage medium is provided having recorded thereon instructions which, when implemented by a computer device, cause the computer device to be arranged as set forth herein and/or which cause the computer device to perform the method as set forth herein.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

The example embodiments of the present invention will be discussed in detail in relation to computers and computer devices using the Windows™ family of operating systems provided by Microsoft™. However, the teachings, principles and techniques of the present invention are also applicable in other example embodiments. For example, the example embodiments are also applicable to other operating systems, in particular those having a discretionary access control security model.

Overview—User Accounts

Figure 1:
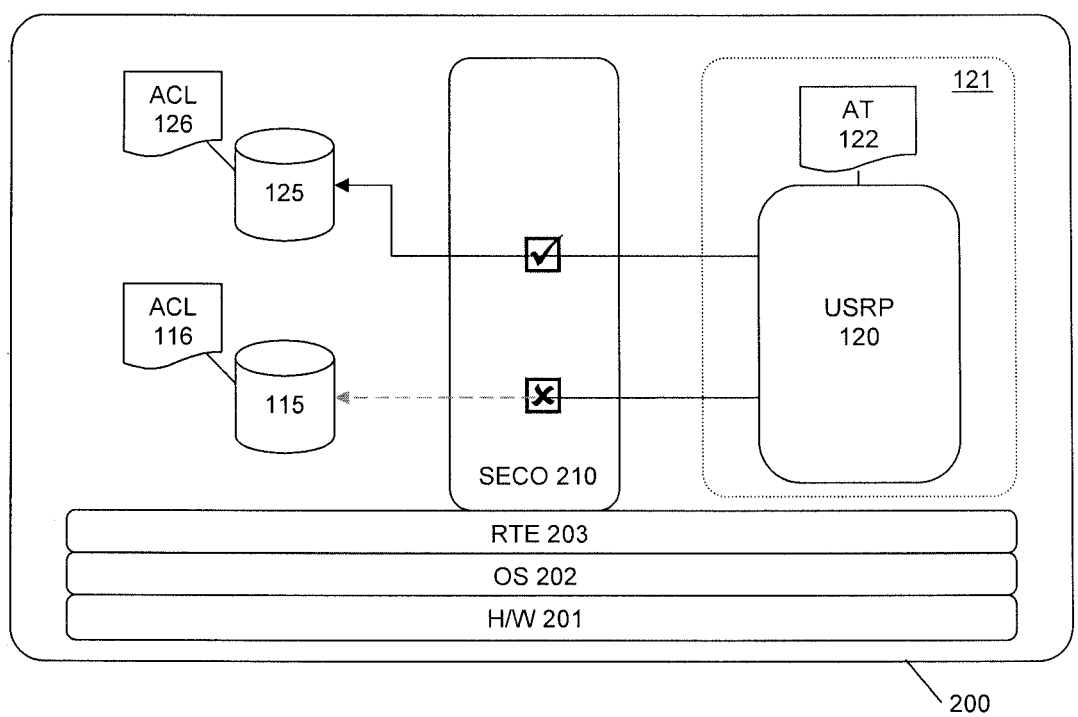
FIG. 1 is a schematic overview of a computer device in which the example embodiments may be applied.

FIG. 1 is a schematic overview of a computer device 200 according to an example embodiment of the present invention. In this example, the host computer device 200 includes physical hardware (HW) 201 such as memory, processors, I/O interfaces, backbone, power supply and so on as are found in, for example, a typical server computer. An operating system (OS) 202 provides a multitude of components, modules and units that coordinate to provide a runtime environment (RTE) 203 which supports execution of a plurality of processes. Here, the processes may include a one or more user processes (USRP) 120. The user processes 120 may relate to one or more application programs which the user desires to execute on the computer device 200.

The computer device 200 includes a plurality of resources 115, 125. These resources 115, 125 are the components of the computer device that the processes 120 will rely upon in order to carry out their execution. For example, the resources 115, 125 may include installed software, system services, drivers, files and/or registry settings.

As shown in FIG. 1, the operating system 202 includes a security module (SECO) 210 which is provided to enforce security within the computer device 200. As one example, the security module 210 is provided by the Windows™ operating system as supplied by Microsoft Corp of Redmond, Wash., USA, under the trade marks Windows NT, Windows 2000, Windows XP, Windows Vista, Windows Server 2003, Windows Server 2008, and Windows 7, amongst others. The security module 210, also termed a security sub-system or security manager, suitably enacts the Windows security model as described, for example, in "Windows Security Overview" published 10 Jun. 2011 by Microsoft Corporation.

Each process 120 that a user initiates will be run in a security context 121 that derives access rights and permissions from the user's account. To this end, each process 120 is provided with an access token (AT) 122. The access token 122 typically carries the security identity (SID) of the user and SIDs of any other security groups to which the user belongs. The access token 122 thus defines the privileges as held on this host computer 200 by the user and the relevant security groups.

In the example embodiment, the security module 210 is arranged to perform an access check when a user process 120 requests access to any of the resource 115, 125. The security module 210 performs the access check by comparing the access token 122 of the process 120 against a security descriptor, such as an access control list (ACL) 116, 126, associated with the relevant resource 115, 125. Here, the access control list 116, 126 is suitably a Discretionary Access Control List (DACL) which identifies SIDs of users and groups that are allowed, or denied, various types of access (read, write, etc.) as appropriate for that resource.

In FIG. 1, the security module (SECO) 210 in the operating system 202 is sufficient to prevent the user process 120 from tampering with certain key resources 115 while allowing the user process 120 to access appropriate user resources 125, according to the respective access control list 116, 126. For example, the user process 120 is able to read from, but not write to, a file of the key resources 115. Typically, the defined access types will depend upon the type of resource being accessed. For example, storage is typically defined by read and write access rights, while a process may have terminate access rights which determine whether or not a request to terminate that process will be actioned by the operating system 202. As noted above, a user-level security context 121 is based on the user as the security principal and the access token 122 is set accordingly. Suitably, in a system which adopts the least-privilege access model, the user-level security context 121 is deliberately restricted to a minimal set of access rights.

Figure 2:
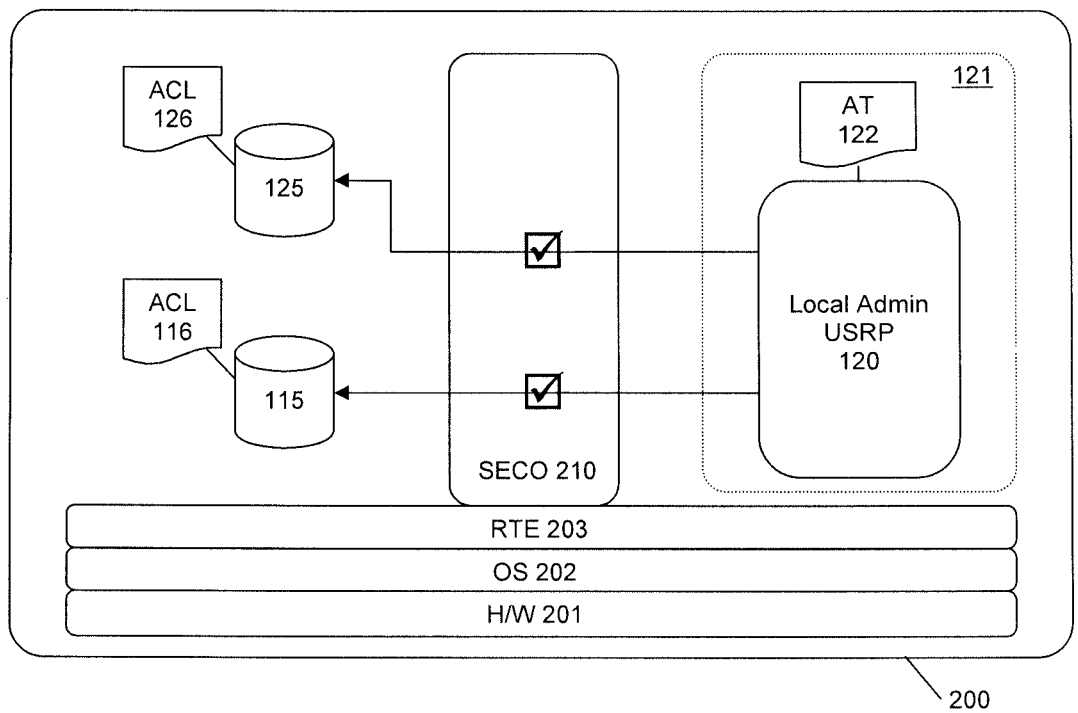
FIG. 2 is a schematic diagram showing the example computer device in more detail concerning access to resources by a process.

FIG. 2 is a schematic diagram showing the example computer device in more detail. In this example, the user process is able to access both the permitted user resources 125 and also the key resources 115. In this example, the key resources 115 are any resources of the computer device where it is desired to protect those resources against access by the user processes 120.

In practice, it is common for a user to be included in a security group, such as the local administrator security group, so that application programs desired by the user will install and operate correctly without needing additional support from a higher-authorised user (such as IT administrator personnel). Where a user is included in such a privileged security group, all of the user process 120 initiated by that user will then be granted the higher-level privilege rights, such as local administrator rights, indiscriminately. Thus, granting local administrator rights, or similar higher privileges, generally allows all user processes 120 to access many of the key resources 115 of the computer system in an indiscriminate manner.

Process Elevation

Figure 3:
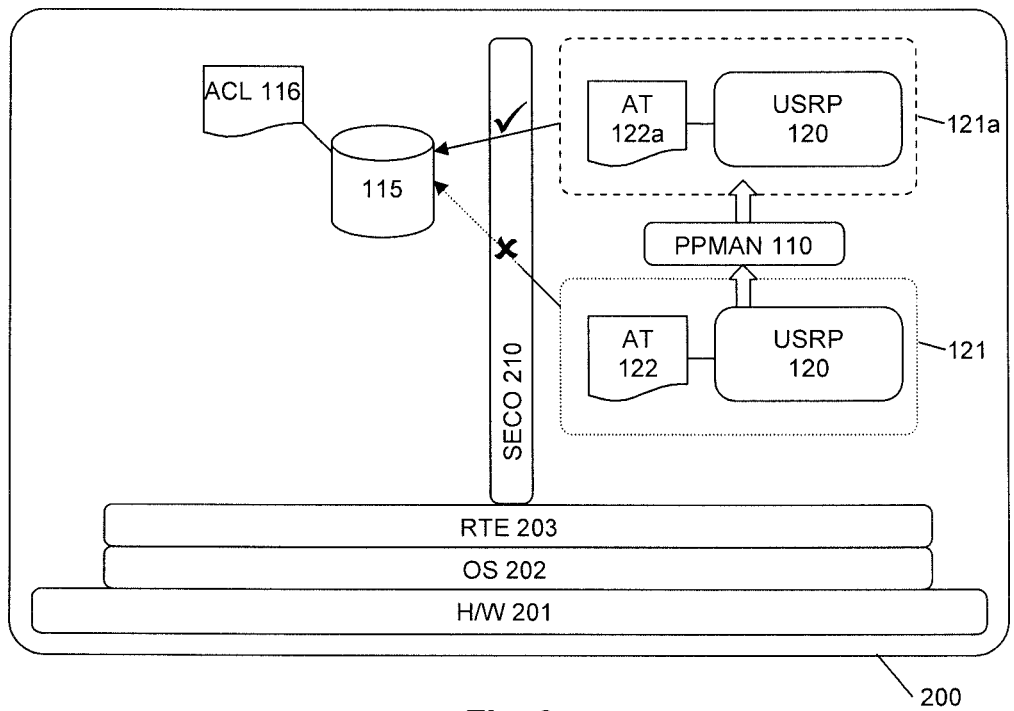
FIG. 3 is a schematic diagram showing the example computer device in more detail concerning a process privilege management mechanism.

FIG. 3 is a schematic diagram showing the example computer device in more detail. In this example, the computer device includes a privilege management module (PPMAN) 110. This module 110 is arranged to perform dynamic process privilege reassignment, whereby the user process 120 is examined and selectively provided with an adjusted set of privileges. Typically, the privileges of the user process 120 are elevated above an initial level. However, it is also possible to selectively degrade the privilege level of a particular user process using the same adjustment mechanism.

As shown in FIG. 3, the user process 120 is granted a privileged user security context 121*a* by the privilege management module 110. This can be considered as a dynamic elevation of the privilege level of the user process 120, so that the specific user process 120 is able to achieve a desired, legitimate function which requires greater access rights than were available initially. The process 120 is to be elevated is provided with a new access token 122*a*, which is created based on the initial access token 122 of that process. As one example, the SID of the local administrator group is added to this new access token 122*a*, and consequently the process 120 now obtains the privileges and integrity level of the local administrator. The user process 120 is then assigned the new access token 122*a*, such as by stopping and restarting the process, and thus the privileged user security context 121*a* is now applied to that user process 120.

COM Objects

Figure 4:
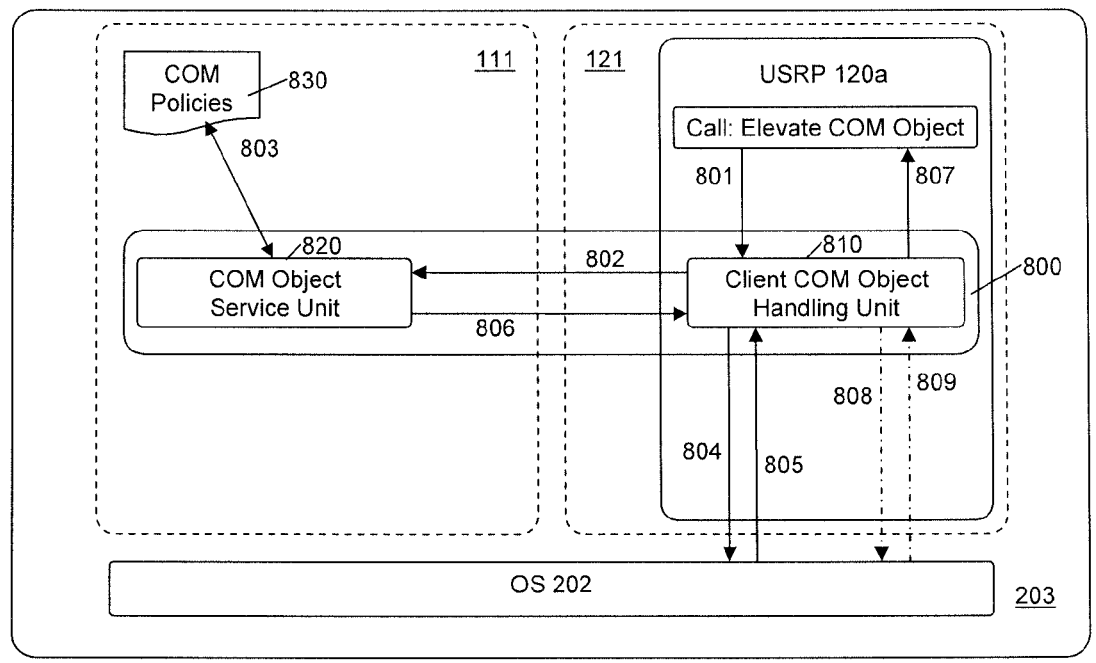
FIG. 4 is a schematic diagram showing the example computer device in more detail concerning a COM object handling mechanism and a method of handling COM objects in the computer device.
Figure 5:
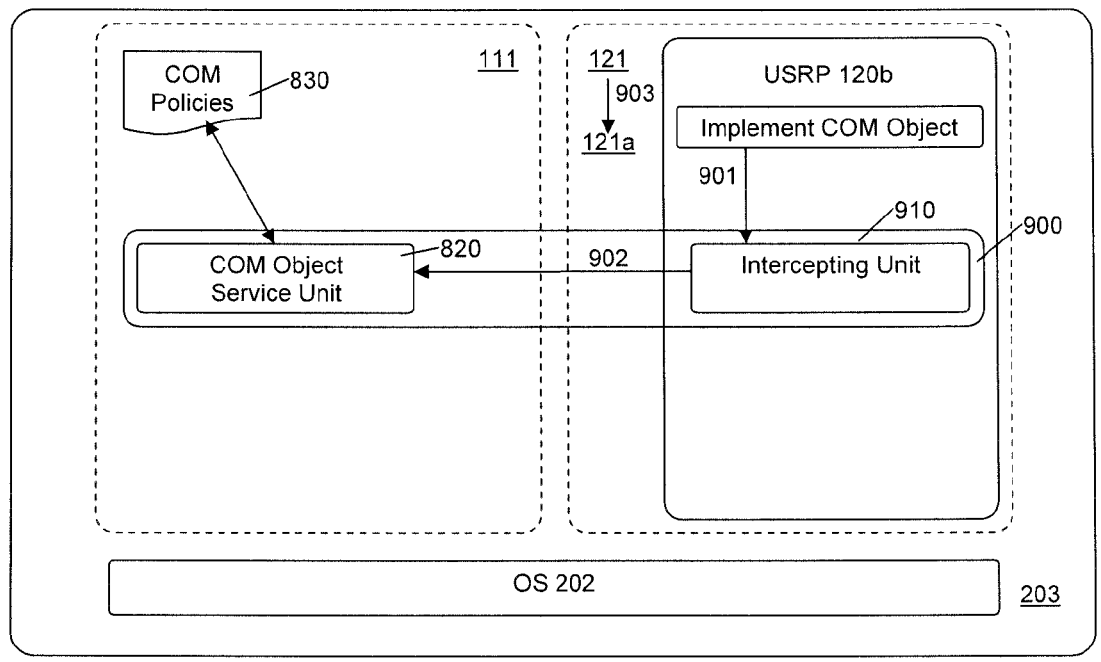
FIG. 5 is a schematic diagram showing the example computer device in more detail concerning a COM object handling mechanism and a method of handling COM objects in the computer device.

FIGS. 4 & 5 are schematic diagrams showing the example computer device in more detail concerning an example COM object handling unit and COM object handling method.

In the example embodiments, COM objects can be considered as a specific type of resource to be accessed by the user process 120, and can be controlled by hooking the relevant Windows API functions that are responsible for creating COMobjects.

COM objects are language and platform independent. Hence, the specific examples given below using syntax from the Microsoft™ environment familiar to many persons skilled in the art are intended purely for illustration and are not intended to limit the scope of this disclosure in any way.

As will be familiar to those skilled in the art, the Windows™ operating system allows a process to request an elevated COM object by using a COM elevation moniker. The COM elevation moniker allows applications that are running under user account control (UAC) to activate COM classes with elevated privileges. However, the user account must itself have sufficient privileges (e.g. local administrator rights), or the elevation must be manually permitted with over-the-shoulder supervision of administrator personnel (such as by manually typing in the administrator password via a dialog box). Hence, even the COM elevation moniker facility of Windows™ still does not allow an ordinary least-privileges user account, by itself, to achieve the elevated privileges that are required in many practical situations.

As illustrated in FIGS. 4 & 5, the example mechanism operates in two phases. In a first phase, a COM object is created ready to be used. In a second phase, the COM object is implemented in an elevated context.

As shown in FIG. 4, a COM object creating unit 800 includes a client COM object handling unit 810, a COM object service unit 820, and a set of COM handling policies 830.

In the first phase, a first user process 120 requests creation of an elevated COM object at step 801. The relevant API call is intercepted by the Client COM Object Handling Unit 810. In this example, each CoGetObject API call is intercepted and examined looking for the elevation moniker in the object name (e.g. "Elevation:Administrator!new:{CLSID}" or "Elevation:Highest!new:{CLSID}"). At step 802, when the examination is positive, the intercepted call is passed to the COM Object Service Unit 820.

At step 803, the COM object requested in the API call is checked against a set of COM handling policies 830 to check whether the user is authorized to access this type of COM object. Suitably, the COM handling policies are defined in advance and are recorded on a storage device that is accessible by the computer device. In the example embodiments, a CLSID (class ID) is used as the primary identification for a COM object, but other properties may also be used to identify the COM object, including AppID (Application ID), server file (a DLL or EXE that implements the COM object), and various attributes of the server file, such as publisher, product name, product description, version information etc.

Where the COM policies 830 include a policy setting that authorizes the user to access this type of COM object then, at step 804, the requested COM object is created. In the example embodiments, the COM object is created without the elevation moniker, which prevents User Account Control (UAC) from handling the request. As an example, this step can be achieved by calling CoCreateInstance, as opposed to passing control back to the original CoGetObject. A similar result can be achieved by stripping out the moniker information and calling the original CoGetObject. The operating system 202 then creates the COM object as expected and, at step 805, information about the created COM object is stored by the proxy COM object handling unit 820 for use in the second phase. At steps 806 & 807, control is then passed back to the caller of CoGetObject within the user process 120, reporting successful creation of the requested COM object.

Where the COM policies 830 include a policy setting that blocks the user from accessing this type of COM object then a fail is reported at step 804. In response, a suitable message is displayed to the user and control is passed back to the caller of CoGetObject with a suitable error code.

In this example embodiment, where there are no policy settings in the COM policies 830 concerning access to this type of COM object then, at steps 808 & 809, control is passed unaltered to the original CoGetObject to let the operating system 202 and User Account Control (UAC) mechanisms 250 deal with the request as normal.

The second phase deals with the interception of the process that implements the COM object and selectively elevating the privileges of that implementing process if required. FIG. 5 is a schematic diagram showing the COM implementing mechanism in more detail.

As shown in FIG. 5, a COM implementing unit 900 includes an intercepting unit 910 and the service unit 820.

The relevant second user process 120b which will implement the COM object of interest is intercepted at step 901. In the example embodiments, process interception can be performed in a number of ways, including hooking one or more APIs responsible for creating processes or implementing a kernel driver that is notified as processes start.

The intercepted process 120b is examined at step 902 and compared against the stored information concerning the created COM object as stored previously by the COM Object Service Unit 820. Where the intercepted process is found to be hosting a COM object that the user is authorized to access, then the intercepted process 120b is assigned elevated privileges at step 903. The elevated privileges may be assigned using the privilege management module (PPMAN) 110 as discussed above by issuing a revised access token to the process.

The example COM handling mechanism allows elevated COM objects to be whitelisted or blacklisted in policy settings, and if whitelisted they are launched with elevated privileges, without the user requiring access to an administrator account.

A COM object can be either in-process (DLL) or out of process (EXE), and the example embodiments have been developed to handle each of these scenarios.

Elevated in-process COM objects are implemented in a DLL file (DLL) and are hosted by a special COM surrogate process in a Windows environment. This surrogate process is intercepted (as it starts up) such as by using the hooking mechanism discussed herein. The surrogate process is examined, particularly based on its command line, and compared against the COM handling information stored in the COM Object Service Unit 820 in the first phase. Thus, the service unit 820 determines whether the user was previously granted access to the COM object of interest. In the example embodiments, the surrogate process is dllhost.exe, and the command line contains the AppID of the COM object "dllhost/ProcessId:{AppId}". This AppID and the user who owns the dllhost process can be used to match an entry in the stored COM handling information from the first phase. In the example embodiments, an in-process COM object is signified by the presence of an "InProcServer32" key under the CLSID key for the COM object in the Registry.

Elevated out-of-process COM objects are implemented in an executable file (EXE). In the example embodiments, the executable file is intercepted when it starts. The executable file is examined based on its command line and compared against the stored COM handling information from the first phase to check whether the user was granted access to the COM object. An out of process COM object is signified by the presence of a "LocalServer32" value in the registry for the CLSID of the COM object.

In summary, the example embodiments have described an improved mechanism to control access to a COM objects within a computer device. The industrial application of the example embodiments will be clear from the discussion herein.

Although a few preferred embodiments have been shown and described, it will be appreciated by those skilled in the art that various changes and modifications might be made without departing from the scope of the invention, as defined in the appended claims.

The invention claimed is:

1. A method of controlling access to a component object model (COM) object in a computer device, the method comprising:
    intercepting a request by a first user process for creation of a COM object as an elevated COM object having an elevated privilege level which is elevated with respect to a privilege level of the first user process;
    determining whether the first user process is entitled to access the COM object;
    if the first user process is entitled to access the COM object, creating the COM object without the requested elevated privilege level;
    reporting successful creation of the requested COM object to the first user process;
    intercepting a second user process that implements the COM object;
    confirming that the second user process is entitled to access the COM object; and
    if the second user process is entitled to access the COM object, elevating the privilege level of the second user process that implements the COM object to the requested elevated privilege level.

2. The method of claim 1, wherein intercepting a request by a first user process for creation of a COM object as an elevated COM object having an elevated privilege level which is elevated with respect to a privilege level of the first user process comprises intercepting a call to an operating system of the computer device which requests creation of the COM object.

3. The method of claim 1, wherein determining whether the first user process is entitled to access the COM object comprises comparing the request against a set of COM policies which define access to COM objects by the user processes.

4. The method of claim 3, wherein the COM policies define types of COM objects which the user processes are permitted to access and types of COM objects which the user processes are not permitted to access.

5. The method of claim 4, further comprising passing the request to an operating system of the computer device where the request concerns a type of COM object for which a COM policy is not defined.

6. The method of claim 1, wherein creating the COM object without the requested elevated privilege level comprises creating the COM object with the privilege level of the first user process, and wherein elevating the privilege level of the second user process that implements the COM object to the requested elevated privilege level comprises elevating the privilege level of the second user process to the elevated privilege level from the request for creation of the elevated COM object.

7. The method of claim 1, wherein creating the COM object without the requested elevated privilege level comprises recording an identity of the created COM object, and wherein intercepting a second user process that implements the COM object comprises intercepting the second user process at start-up and extracting an identity of the COM object from the second user process, and wherein confirming that the second user process is entitled to access the COM object comprises matching the identity extracted from the second user process with the recorded identity of the COM object.

8. The method of claim 1, wherein the second user process is an in-process dynamic linked library hosted by a surrogate process and wherein intercepting a second user process that implements the COM object comprises intercepting the surrogate process.

9. The method of claim 1, wherein the second user process is an out of process executable file and wherein intercepting a second user process that implements the COM object comprises intercepting the executable file.

10. The method of claim 1, wherein elevating the privilege level of the second user process that implements the COM object to the requested elevated privilege level comprises providing the second user process with a revised access token defining the elevated privilege level.

11. The method of claim 1, wherein upon creation of each of a plurality of COM objects, the method further comprises repeating:
    intercepting a request by the first user process for creation of a COM object as an elevated COM object having an elevated privilege level which is elevated with respect to a privilege level of the first user process;
    determining whether the first user process is entitled to access the COM object; and
    if the first user process is entitled to access the COM object, creating the COM object without the requested elevated privilege level; and
wherein upon implementation of any of the COM objects, the method further comprises repeating:
    intercepting a second user process that implements the COM object;
    confirming that the second user process is entitled to access the COM object; and
    if the second user process is entitled to access the COM object, elevating the privilege level of the second user process that implements the COM object to the requested elevated privilege level.

12. A computer device which controls access to COM objects, the computer device comprising:
    a memory circuit configured to store instructions; and
    a processing circuit operatively connected to the memory circuit and configured to execute the instructions to:
        intercept a request by a first user process for creation of a COM object as an elevated COM object having an elevated privilege level which is elevated with respect to a privilege level of the first user process;
        determine whether the first user process is entitled to access the COM object, and if so:
            create the COM object without the elevated privilege level;
            report successful creation of the requested COM object to the first user process;
            intercept a second user process that implements the COM object; and
            confirm that the second user process is entitled to access the COM object and, if so, elevate the privilege level of the second user process that implements the COM object to the requested elevated privilege level.

13. The computer device of claim 12, wherein the processing circuit is further configured to:
    create the COM object with the privilege level of the first user process; and
    elevate the privilege level of the second user process to the elevated privilege level from the request of the elevated COM object if the second user process is entitled to access the COM object.

14. The computer device of claim 13, wherein the processing circuit is further configured to:
    record an identity of the COM object;
    intercept the second user process at start-up and extract an identity of the COM object from the second user process; and
    match the identity extracted from the second user process with the recorded identity of the COM object.

15. A tangible, non-transient computer readable storage medium having recorded instructions thereon which, when implemented by a computer device, cause the computer device to perform the steps of:
    intercept a request by a first user process for creation of a COM object as an elevated COM object having an elevated privilege level which is elevated with respect to a privilege level of the first user process;
    determine whether the first user process is entitled to access the COM object;
    if the first user process is entitled to access the COM object, create the COM object without the requested elevated privilege level;
    report successful creation of the requested COM object to the first user process;
    intercept a second user process that implements the COM object;
    confirm that the second user process is entitled to access the COM object; and
    if the second user process is entitled to access the COM object, elevate the privilege level of the second user process that implements the COM object to the requested elevated privilege level.

* * * * *